United States Patent
Conley et al.

(10) Patent No.: US 6,226,907 B1
(45) Date of Patent: May 8, 2001

(54) DISPLAY HAVING COMBINATION OF VISUALLY MOVEABLE AND STATIONARY ELEMENTS AND PROCESS FOR MAKING THE SAME

(75) Inventors: Kenneth Conley, Matthews, NC (US); Candace Michele Tanner, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/210,317

(22) Filed: Dec. 11, 1998

Related U.S. Application Data

(60) Provisional application No. 60/083,451, filed on Apr. 29, 1998.

(51) Int. Cl.$^7$ .................................................. G03B 25/02
(52) U.S. Cl. .................................................. 40/454; 359/619
(58) Field of Search ................................ 40/454; 359/619

(56) References Cited

U.S. PATENT DOCUMENTS

| | | | |
|---|---|---|---|
| 3,119,195 | * 1/1964 | Braunhut | 40/454 |
| 4,040,353 | 8/1977 | Lefebvre | 101/426 |
| 4,208,811 | 6/1980 | Junowicz | 35/27 |
| 4,263,737 | 4/1981 | Simon | 40/453 |
| 4,498,736 | 2/1985 | Griffin | 350/167 |
| 4,897,802 | 1/1990 | Atkinson et al. | 364/518 |
| 4,959,641 | * 9/1990 | Bass et al. | 40/454 |
| 5,098,302 | 3/1992 | Sekiguchi | 434/426 |
| 5,100,330 | 3/1992 | Sekiguchi | 434/426 |
| 5,113,213 | 5/1992 | Sandor et al. | 355/22 |
| 5,161,979 | 11/1992 | Sekiguchi | 434/365 |
| 5,457,515 | 10/1995 | Quadracci et al. | 355/132 |
| 5,488,451 | 1/1996 | Goggins | 355/77 |
| 5,543,874 | 8/1996 | Winnek | 354/112 |
| 5,617,178 | 4/1997 | Goggins | 355/22 |
| 5,633,719 | 5/1997 | Oehlbeck et al. | 356/401 |
| 5,695,346 | 12/1997 | Sekiguchi | 434/365 |

FOREIGN PATENT DOCUMENTS

| | | | |
|---|---|---|---|
| 619 513 | 1/1994 | (EP) | 35/24 |
| 743552 | 3/1996 | (EP) | 35/14 |

OTHER PUBLICATIONS

O'Leary, Sean, "Smoke, Mirrors and Lenticules", Eastman Chemical Company, Entire Pamphlet, Publication MBS–154.

* cited by examiner

*Primary Examiner*—Terry Lee Melius
*Assistant Examiner*—Andrea Chop
(74) *Attorney, Agent, or Firm*—Cherly Tubach; Harry Gwinnell

(57) ABSTRACT

A two-dimensional display having a three-dimensional visual appearance has printed on a substantially flat or planar surface a predetermined message or information. Superposed over the message is a lenticular lens. Adjacent to the message are a series of spaced apart lines which may either be coplanar or non-coplanar relative to the message. The spaced apart lines are arranged so that they are in a non-registration relationship with the spacing of individual lenticules forming the lenticular lens. The display produces an appearance of having the lines float or move as a viewer's focal angle or perspective of the display changes. A method for making such a display is also provided.

26 Claims, 3 Drawing Sheets

DISPLAY HAVING COMBINATION OF VISUALLY MOVEABLE AND STATIONARY ELEMENTS AND PROCESS FOR MAKING THE SAME

CROSS-REFERENCE TO RELATED APPLICATIONS

Benefit is claimed under 35 U.S.C. §119 to the earlier filed U.S. provisional application having U.S. Ser. No. 60/083,451 filed Apr. 29, 1998, the entire disclosure of which is incorporated herein by reference.

FIELD OF THE INVENTION

This Invention relates to two-dimensional displays and particularly to two-dimensional displays which have a visual presentation of a moveable component and a stationary component. More particularly, the invention relates to two-dimensional displays having three-dimensional visual presentation using lenticular lens or screen technology. The invention further relates to a method for producing such displays.

BACKGROUND OF THE INVENTION

Conventional print advertising and packaging is accomplished by printing, two-dimensional, non-movable information using words and pictures or graphics on magazines, newspapers, brochures, fliers, posters, billboards, and signs. While many conventional print advertisement and packaging are interesting, most are not. The primary purpose of good advertisement in packaging is to attract the attention of the reader or customer and convey the desired information. Unfortunately, many printed signs, advertisements and packages do not attract the attention of the desired audience or customers.

One area that seems to be of particular concern are signs that convey important messages of direction, caution or danger, such as "yield", "stop", "danger", or "open construction", and the like. Typically, these signs rely on bright and visually distinct or differentiating coloration to attract the attention of the person. One problem with such signs is that to the extent that the coloration is not sufficiently bright or the individual is not as sensitive or attentive to the particular colors chosen for attracting the person's attention the message may never be seen. One can readily understand the importance of capturing their attention for a sufficient duration to convey the desired message.

In an effort to attract a person's attention, such as a passerby or a customer, various types of signs have been utilized. For example, electrical signs such as illuminated signs including neon signs, billboard illuminated with floodlights, spotlights, marquees with moving messages, blinking lights, etc. have been used. However, such signs are very costly, bulky and difficult to repair and are not practical for such packages as magazines, newspapers, construction sites or for conventional marketing displays which would attract someone's attention to the information. Another effort in this endeavor has been to use lenticular imaging.

Lenticular images produce a three dimensional effect but with a lower perspective. Two components of a lenticular image are a master composite print and the lenticular screen or lens. Lenticular lenses are known and commercially available from a variety of manufacturers. These lenses typically consist of an array of identical spherically-curved surfaces embossed or otherwise formed on the front surface of a plastic sheet. Other geometric patterns for the lens may also be used such as pyramidal. In the case where the lens is spherically-curved, each individual lens or lenticule resembles a semi-cylinder extending the full length of the underlying image over which it is superposed. The back surface of the lens is typically substantially flat or planar and is the surface in contact with the underlying flat image.

In typical lenticular imaging, the master or composite print, includes a series of images photographed by using a multiple lens camera to produce three different images. These images are then combined or "laid up" onto a single compressed print consisting of a pattern of very narrow bands. A master image may consist of from 7 to about 24 photo views. To create a 3-D image using a lenticular lens, specialized equipment is needed along with a technical understanding and experience as how to use the equipment effectively. Setting up the photo is quite difficult and different from a two-dimensional shot. It requires precise positioning of the visual elements to maximize the dimensional effect. The relationships among such factors as the number of exposures, distance between track positions for the camera and front or rear locations of the objects and backgrounds must be computed mathematically in order to simulate a natural parallax.

Another problem associated with such lenticular displays is cost. A lenticular display can range from $3,000 to $5,000. Added to that is about $1,500 to $6,000 for image mastering. In an effort to reduce the cost of producing such images using lenticular lenses U.S. Pat. No. 5,617,718 issued to Goggins on Apr. 1, 1997 discloses using a computer generated lithograph or lithographic separation on an electronic page. The page consists of a collection of page elements that are arranged in a desired order. The elements can be drawn from a wide variety of sources such as photographs, original artwork, etc. The electronic page is then outputted to a half-tone film separation, that is a film bearing an image of the electronic page in a half-tone screen. Half-tone screens consist of an array of dots varying in size in relation to tonal values of the elements of the page. However, such lithographic separation methods produce moiré interference or screen interference. Moiré interference results from the overlapping of two or more grid patterns including the half-tone dots in film separation. Screen interference is also known as stair-stepping or jaggies. In an effort to eliminate the moiré from lenticular images, Goggins teaches using a stochastic or frequency-modulated technique. He teaches using a direct pixel to pixel relationship to yield a resolution which is greater than conventional half-tone dot resolution. Moreover, Goggins teaches that in order to impart the illusion of depth and/or motion to a static image, the image must be made from multiple pictures. Each picture is rastorized at a non-binary pixel resolution or depth that corresponds to the resolution of the line count of the lenticular lens times the number of frames used to create the lithographic separation. In stochastic screening, the tonal quality of an image is represented by the frequency of the binary pixels which are all of like size. The stochastic image resolution is tuned so that each segment of a composite picture fits as precisely as possible within the width of the overlying lenticle.

U.S. Pat. No. 4,040,353 issued to Lefebvre on Aug. 9, 1977 discloses a display sign utilizing at least two different colors which are juxtaposed along unitary zones whereby the zones are distributed in a substantially uniform manner on a first area. The average surface of each area of the unitary zones is defined according to a predetermined distance below which the two areas are distinguished by the eye. The sum of the surface areas of the unitary zones of each color corresponds to a clearly defined percentage of the total surface area of the first area. The second area is colored by the resultant color of the optical mixture in the percentages defined for the first area. The second area is uniformly colored by a single color. By varying the characteristics of the first area such as the average surface area of the unitary zones, different perception distances can be produced. Thus, an eye moving toward a base surface will sufficiently perceive several areas arranged on the base surface or even overlapping or nested within one another. When the second area, which serves as the base surface, is also contoured by zonal juxtapositioning it becomes possible to combine all the characteristics of the two areas to obtain varied effects.

U.S. Pat. No. 4,897,802 issued to Atkinson et al. on Jan. 30, 1990 discloses a display system having a single-frame transparency which contains four independent images, each of the images having spaced apart groups of pixels interlaced with groups of pixels of each of the other images with each of the images being selectable for projection by a moving grid mask.

U.S. Pat. No. 5,113,213 issued to Sandor et al. on May. 12, 1992 discloses a method for making autosterographic images of an object using a computer. A predetermined number of planar images of the object are taken with each image being a view of the object the respective different viewpoint. These viewpoint images are then input into the computer from which they are interleaved using a high-resolution output imaging device on a spacer with a selected edge of each interleaved image being aligned with a predetermined direction on the spacer.

U.S. Pat. No. 5,161,979 issued to Sekuguchi on Nov. 10, 1992, discloses a display which can feature moveable images. The process comprises generating at least two images with a computer or other central processing unit. The first image is then scanned into the computer and then subs altered or modified so that at least one and preferably all the images are masked and striped on the CPU by electronically removing, erasing, canceling or otherwise deleting a symmetrical pattern of spaces on the images to form masked images with a spaced array of stripes comprising viewable opaque portions with spaces positioned between the separating stripes. After masking, at least a portion of the masked images are overlaid, superimposed and combined upon each other in offset relationship so that the viewable stripes of one image are positioned in the spaces of the other image.

U.S. Pat. No. 5,543,874 issued to Winnek on Aug. 6, 1996 discloses a system of using an image processor, such as a scanning device, between the viewing screen of an electromagnetic radiation output device and a recording medium, such as a lenticular film or other recording medium.

Accordingly, there is a need for an improved two-dimensional display sign that gives a distinctive and novel three-dimensional visual effect without the high cost or using an expensive computer, high-resolution printer, or multiple image mastering.

There is also a need for an improved process for producing an attractive and visually distinctive display sign that is efficient, effective and economical.

SUMMARY OF THE INVENTION

Briefly, the present invention provides for a two-dimensional display sign which renders a three-dimensional visual presentation of information to a viewer passing by the display. As used herein the term "three-dimensional" is used to describe a display having a height, width and an appearance of motion. Broadly, the two-dimensional display includes a lenticular lens having a substantially planar or flat surface with a predetermined printed message or information adjacent thereto. As is customary for a lenticular lens, superposed over the planar surface are curvilinear surfaces of lenticules preferably having a spherical or cylindrical curvature. The two dimensional display further includes a line traversing a distance of at least a portion of the planar surface. In a preferred embodiment of the invention, the display sign includes a plurality of spaced apart lines. The spaced apart lines are configured to have a non-registration spacing relative to the lenticules. In the broadest aspect of the invention the information and the lines are printed on the substantially planar, back surface of the lenticular lens.

In another embodiment of the invention, the two-dimensional display has multiple layers to produce a three-dimensional visual presentation of information. The display includes a printable layer such as paper, plastic, wood, and the like, having the desired information printed thereon. Superposed over the printed information is a lenticular lens. To produce a visual effect of movement, the display includes a plurality of spaced apart lines printed on at least one of the substantially planar surfaces, i.e., the printable layer or the back surface of the lenticular lens or any combination thereof. The lines are spaced in a non-registration relationship relative to the lenticules forming the lenticular lens and extend across at least a portion of the back surface of the lenticular lens.

Another aspect of the invention is a method for making a two-dimensional display having a three-dimensional visual appearance. The method includes the steps of providing a message printed on a two-dimensional flat surface and covering at least a portion of the flat surface with a lenticular lens. A plurality of spaced apart lines are provided on the flat surface that extend across at least a portion of the lens. The lines have a spacing that is in non-registration with the lenticule lenses of the lenticular lens. The lines can be printed on the same or different plane as the message. The display, when viewed by a passer-by, gives the appearance of having a stationary message while the lines give an appearance of moving as the visual perspective of the viewer changes relative to the display.

It is an object of the invention to provide a display that is cost effective to make and which effectively attracts a viewer's attention. As used herein the term "viewer" means, preferably, a person but can include any animal capable of perceiving visual stimuli.

It is another object of the invention to provide a two-dimensional display having a visually stationary portion and a visually movable portion.

It is another object of the invention to provide a method for making a two-dimensional display exhibit a visual three-dimensional effect where one of the dimensions is movement.

These and other objects and advantages of the invention will become readily apparent to those skilled in the art with reference to the following specification and the accompanying drawings.

DETAILED DESCRIPTION OF THE PREFERRED EMBODIMENTS

Figure 1:
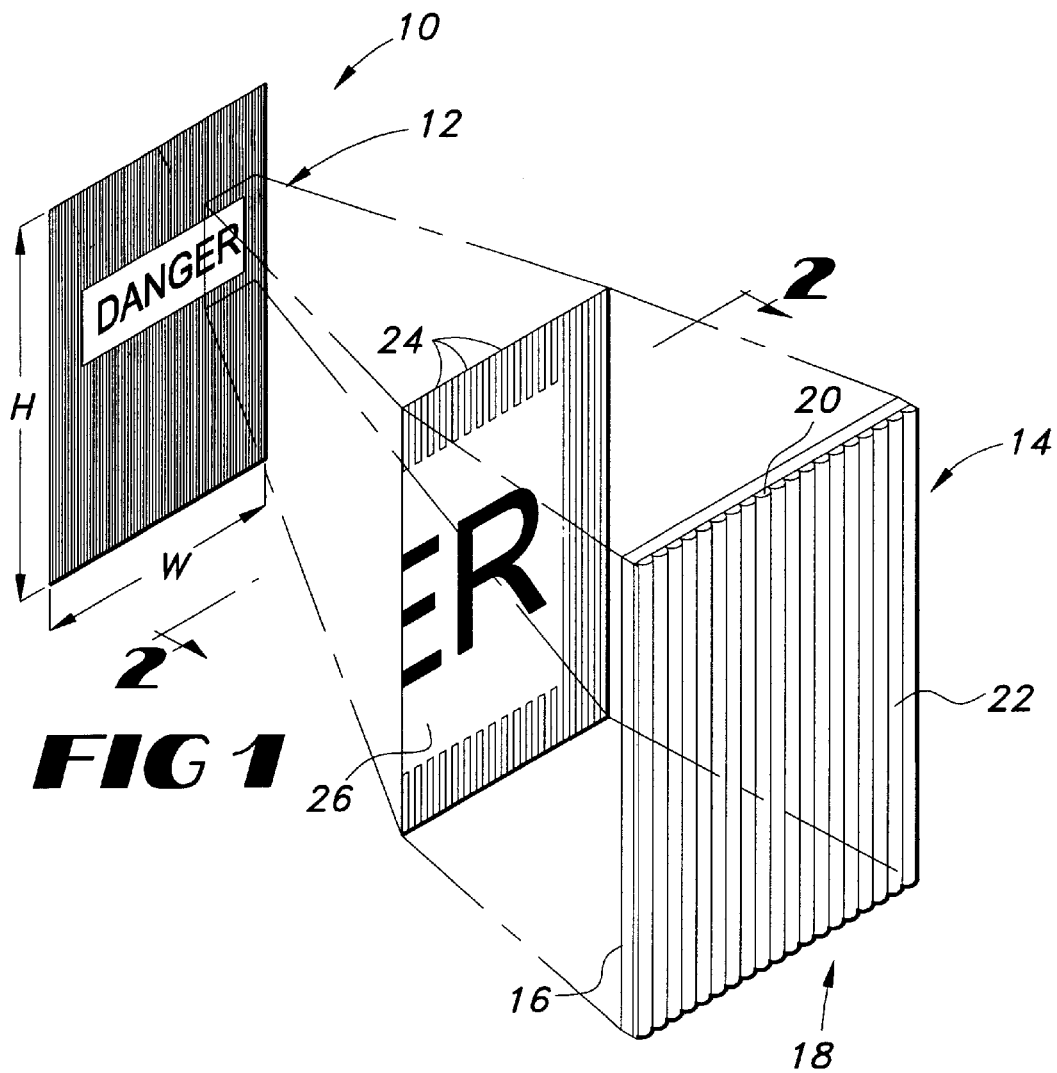
FIG. 1 is an illustration of a display sign in an exploded view format with a section thereof expanded or enlarged to provide clarity of description.

The following detailed description of the invention is made in context of a display sign sized appropriately to be easily moved from and to various locations. However, one skilled in the art will understand that the invention can be applied to other types of displays wherein the object of the display is to capture the viewer's attention sufficiently to convey the message. With reference to the drawing of figures, wherein like parts or objects in the various views and embodiments have similar reference numerals, and particularly to FIGS. 1–4, a two-dimensional display sign 10 illustrated having a printed message 12, ("DANGER" and "BLOW-OUT SALE"). As used herein the term "two-dimensional" means having a predetermined height (H), and width (W) that is sufficient for a viewer to visually see. The overall dimensions of the printed message 12, although important from the perspective of being sized and configured to attract the viewer's attention, are to be understood as not a part of the invention.

Figure 2:
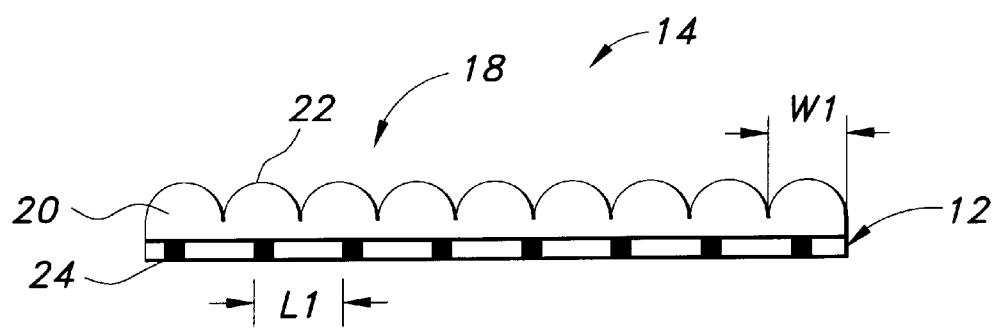
FIG. 2 is a cross-sectional view of FIG. 1 taken along the transverse plane 2—2.

As illustrated in the enlarged and exploded portion of FIG. 1, superposed over at least a portion of the message 12 is a lenticular lens 14. The lenticular lens 14 has two primary surfaces: a substantially flat or first planar surface 16, and a non-planar surface 18. In constructing the display 10, the first planar surface 16 is adjacent to the printed message 12 and in the broadest embodiment of the invention, the message 12 is printed on the first planar surface 16 of the lenticular lens 14. Referring to FIGS. 1 and 2, the first planar surface 16 and the non-planar surface 18 of the lenticular lens 14 consists of a collection of a plurality of individual lenses or lenticules 20 adjacently positioned. Each lenticule 20 is a long semi-cylinder having an identical curvilinear surface 22 embossed or otherwise formed on a plastic sheet. The radius of curvature of the lenticule 20 determines the width $W_1$ and the focal length of the lenticule 20.

The lenticule 20 typically extends the full height (H) of the message 12. The number of lenticules 20 per inch comprising the lenticular lens 14 can vary from about 3 to about 250. Preferably, the number of lenticules 20 per inch range from about 15 to about 150, and more preferably, from about 25 to about 75 lenticules per inch.

Desirably, materials useful in forming the lenticular lens 14 are capable of being thermoformed using techniques known to those skilled in the thermoplastic art. Nonlimiting examples of such materials include: polyesters, such as polyethylene terephthalate (PET), polybutylene terephthalate (PBT) and copolyesters of terephthalic acid and aliphatic glycols such as PETG 6763 (available from Eastman Chemical Company, Kingsport, Tenn.); polycarbonates; polystyrene; acrylics and polyacrylates, such as, poly (methyl methacrylate), methyl methacrylate and copolymers thereof with other vinyl monomers such as other alkyl methacrylates or alkyl acrylates and the like; polyolefins such as polyethylene; vinyl chloride polymers such as polyvinyl chloride (PVC) and its copolymers with other vinyl monomers such as vinylidene chloride, styrene and the like including heavily plasticized PVC compositions or rigid vinyl formulations; polyurethanes including polymers having residues from 2,4-toluenediisocyanate, 1,4-diisocyanatobenzene and the like with diols such as 4,4-bis (omega-hydroxyalkoxy)biphenyls, polypropylene glycol), poly(tetramethylene) glycol, poly(1,4-butylene adipate), poly(ethylene-co-1,4-butylene adipate), polycaprolactone, poly(1,6-hexamethylene) carbonate and the like.

Particularly preferred materials suitable for forming the lenticular lens 14 are copolyesters of terephthalic acid and aliphatic glycols comprising an acid component having at least 75 mole percent terephthalic acid and a glycol component having about 3 mole percent to about 65 mole percent 1,4-cyclohexanedimethanol or neopentyl glycol and about 97 mole percent to about 35 mole percent ethylene glycol. More preferably, the copolyester has at least about 75 mole percent terephthalic acid and a glycol component having about 25 mole percent to about 35 mole percent 1,4-cyclohexanedimethanol or neopentyl glycol and about 75 mole percent to about 65 mole percent ethylene glycol. The remainder of the acid component, up to about 25 mole %, that may be included with the terephthalic acid in the esterification of the copolyester include dibasic acids containing about 4 to about 40 carbon atoms such as naphthalenedicarboxylic, succinic, glutaric, azelaic, adipic, suberic, sebacic, isophthalic, sulfoisophthalic, 1,4-cyclohexanedicarboxylic acid and the like. Any of the naphthalenedicarboxylic acid isomers or mixtures of isomers may be used but the 1,4-1,5-, 2,6-, and 2,7-isomers are preferred. The cis-, trans-, or cis/trans mixtures of 1,4-cyclohexanedicarboxylic acid may also be used.

The glycol component used in the esterification of the copolyester may further be modified with up to about 35 mole %, preferably, up to about 30 mole % and most preferably, up to about 20 mole % with glycols such as diethylene glycol, propylene glycol, neopentyl glycol, 2,2, 4,4-tetramethyl-1,3-cyclobutanediol, 1,3-propanediol, 1,4-butanediol, 1,6-hexanediol, cis/trans mixtures of 1,4-cyclohexanedimethanol and mixtures thereof.

Suitable materials for forming the lenticular lens 14 are commercially available from BASF Corporation under the name ELASTOLLAN, B.F. Goodrich under the name ESTANE, Bayer Corporation under the name TEXIN and DESMOPAN, and Dow Chemical Company under the name PELLETHANE. The lenticules 20 can be formed using roll extrusion techniques that are known to those skilled in the thermoplastic art. The thickness of the thermoplastic sheet used in forming the lenticular lens 14 can range from about 0.04 of an inch to about 0.5 of an inch.

The display 10 further includes at least one line and preferably a plurality of spaced apart lines 24 positioned adjacent to the message 12. The lines 24 may be either opaque, transparent, translucent or any combination thereof. In a preferred embodiment of the invention at least a portion of the lines 24 are parallel, uniformly spaced from each other and have a similar width. As seen in FIGS. 1 and 2, the lines 24 reside in a colanar planar relationship relative to the message 12. That is, the message 12 and the lines 24 reside on the first planar surface 16 of the lenticular lens 14.

The display 10 may further include horizontal lines 26. The display 10 can have any combination of vertical and horizontal lines 24 and 26, respectively, where from 0% to 100% of the lines 24 and 26 have a horizontal component and/or a vertical component, including when, for example, the lines 24 are at an angle of from about 1 degree to about 89 degrees relative to the edge of the display. It is also to be understood that the lines 24 and 26 can be radial, curved or irregular which, when viewed, would give an appearance of a geometric configuration. The lines 24 and 26 may also intersect and if so, desirably, they intersect at right angles or optionally, define a grid pattern (not shown). The lines 24 and 26 may be of a solid color or a mixture of colors to produce various effects. The lines 24 and 26 can be continuous or discontinuous. Desirably, the lines 24 and 26 extend for a distance of at least a portion of the first planar surface 16. In a preferred embodiment, the focal point of each lenticule 20 is from 0 to about 0.5 of an inch beyond the first planar surface. More preferably, the focal point of each lenticule 20 extends from 0.05 of an inch to about 0.5 of an inch beyond the first planar surface 16. Placing the focal point of each lenticule 20 beyond the first planar surface 16 lessens the sharpness of the lines 24 and 26 and provides a soothing, more pleasing effect to the viewer.

The lines 24 and 26 can be printed on the back of the first planar surface 16 of the lenticular lens 14 using conventional and/or UV cured ink systems that are well known in the printing art, such as, inkjet, lithographic, flexographic, screen printing and gravure techniques. For the lines 24 and 26 to have a visual effect of motion it is critical to this invention that the spacing ($L_1$) of the lines 24 be in a non-registration relationship relative to the width spacing $W_1$ of the individual lenticules 20. This permits the lines to come in and out of focus as they are viewed from different angles. The number of lines 24 per inch differs relative to the number of lenticules 20 per inch of from about 0.5% to about 25%, desirably from about 2% to about 20% and more desirably from about 2.5% to about 15%. To illustrate, for visual placement of the message 12 behind the visually moving lines, the number of lines 24 per inch is less than the number of lenticules 20 per inch. Conversely, to visually place the message 12 in front of the visually moving lines the number of lines 24 per inch is greater than the number of lenticules 20 per inch.

The movement of the lines 24 and 26 from left to right or vice versa is determined by the line spacing ($L_1$) relative to the lenticule spacing ($W_1$). To illustrate, when viewing a display 10 from the front, to produce an effect of the lines 24 visually moving form left to right, one chooses a value of the line spacing ($L_1$) less than the number of lenticules 20 per inch of the lens 14. Conversely, to have the lines 24 appear to be moving from right to left, one chooses a value of line spacing ($L_1$) greater than the number of lenticules 20 per inch of the lens.

The width of each line 24 determines the area of the viewing surface that is covered by the visually moving lines. If the width of the line 24 is 50% of the width of the lenticule 20 then the lines will appear to cover 50% of the front surface. Similarly if the width of the lines is 10% the width of the lenticule, then only 10% of the front surface area will be covered.

Figure 3:
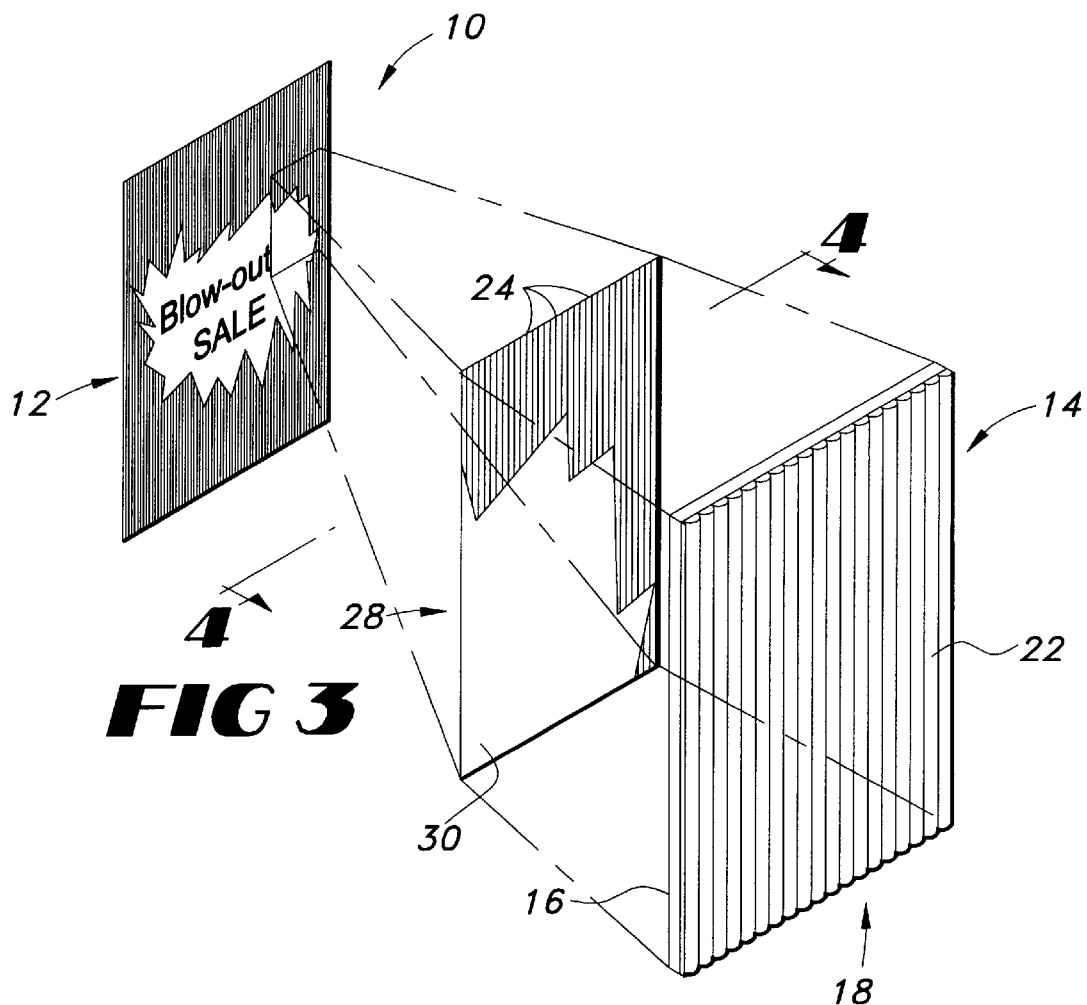
FIG. 3 is an exploded view of another embodiment of the invention having an expanded or enlarged to provide clarity of description.
Figure 4:
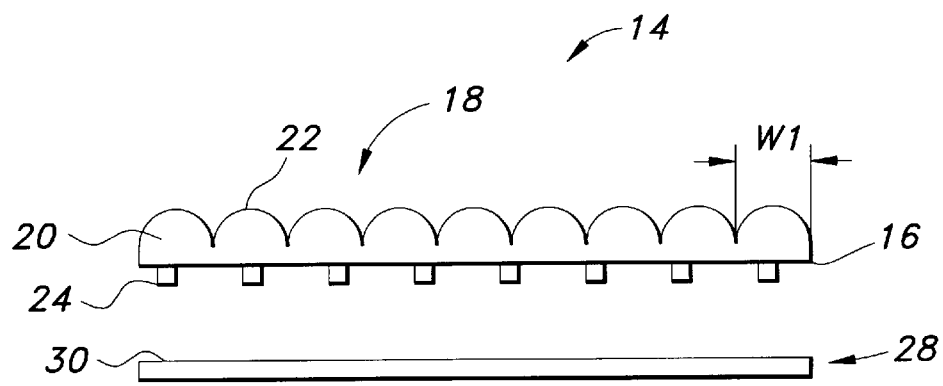
FIG. 4 is a cross-sectional view of FIG. 3 taken along a transverse plane 4—4.

Referring to FIGS. 3 and 4, another embodiment of the display 10 is illustrated. The display 10 is a multilayered, preferably laminated, structure having a lenticular lens 14 superposed over a second layer 28. The second layer 28 has printed on a second planar surface 30 the message 12 ("BLOW-OUT SALE"). The display 10 includes a plurality of spaced apart lines 24 residing in a non-planar relationship relative to the message 12. As seen in FIG. 4, the spaced apart lines 24 are printed on the first planar surface 16 of the lenticular lens 14. The spaced apart lines 24 are similar to those described above. Thus, the spaced apart lines 24 can reside in a non-planar relation, coplanar relation, or any combination thereof relative to the message 12. In constructing the display 10 the message 12 on the second planar surface 30 is positioned adjacent to spaced apart lines 24 printed on the first planar surface 16 of the lenticular lens 14.

Figure 5:
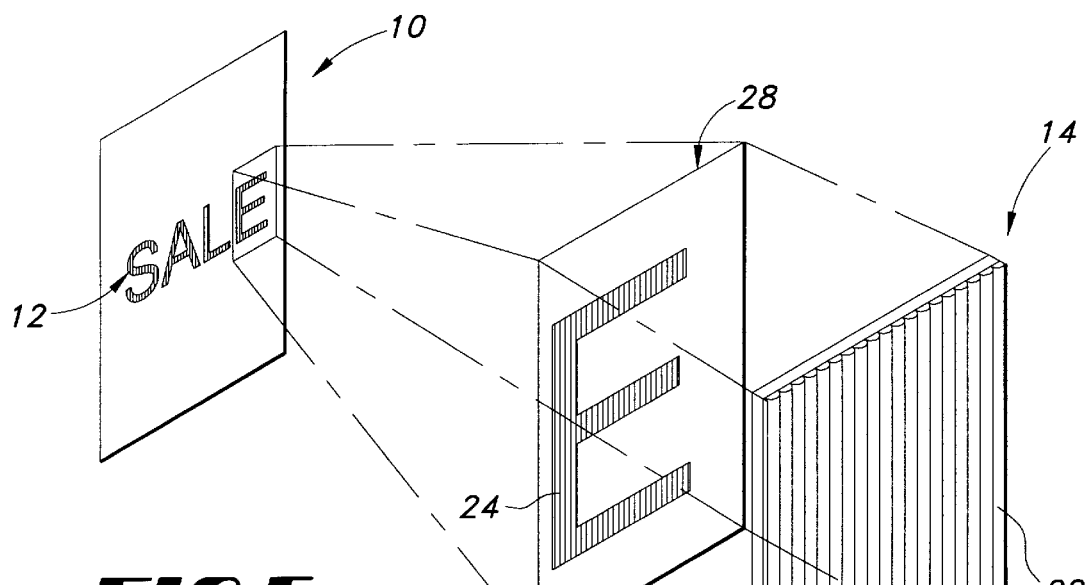
FIG. 5 is an exploded view of another embodiment of the invention having an expanded or enlarged to provide clarity of description.

Referring to FIG. 5, another embodiment of the invention is illustrated where the spaced apart lines 24 themselves constitute the informational section of the display 10. This can be achieved by limiting the placement of the lines 24 to the shape of the desired message 12. As described above, the spaced apart lines 24 can be printed on the first planar surface 16 of the lens 14 or on a separate second layer 28. The remainder of the printed surface 16 or 28 is left blank or can be appropriately colored or covered with another material in a manner that does not conflict with the lines 24.

Figure 6:
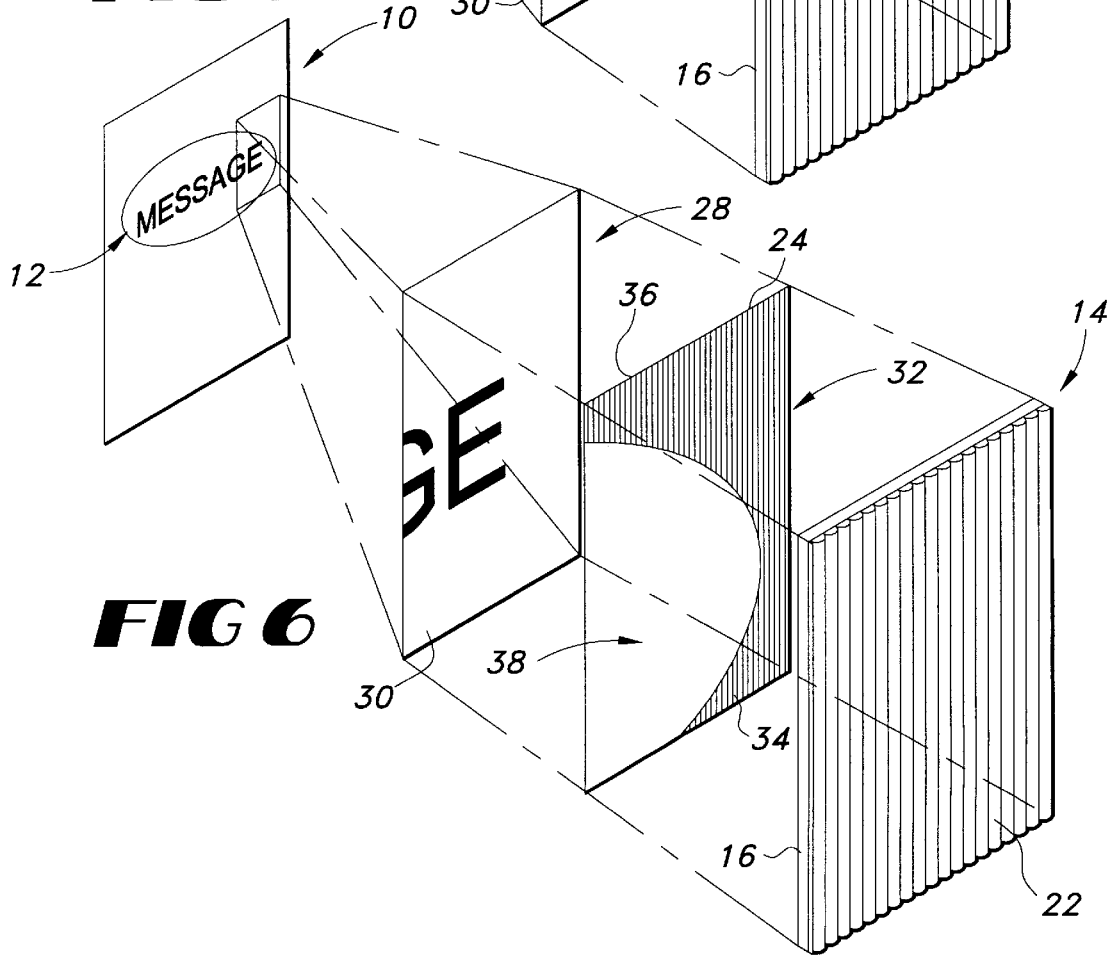
FIG. 6 is an exploded view of another embodiment of the invention having an expanded or enlarged to provide clarity of description.

Referring to FIG. 6, another embodiment of the display 10 is illustrated. The display 10 is a multilayered structure having a lenticular lens 14 superposed over a second layer 28. The second layer 28 has printed on a second planar surface 30 the message 12. The display 10 further includes a third layer 32 interposed between the lenticular lens 14 and the second layer 28. The third layer 32 is substantially flat and, accordingly, has a front planar surface 34 and a back planar surface 36. Desirably, the third layer 32 is constructed of any material that is sufficiently transparent to allow the message to be viewed without substantial distortion or obliteration. For example, the third layer 32 can be constructed from a clear plastic, glass or film.

The spaced apart lines 24 can be positioned on one or more of the substantially planar surfaces 16, 30, 34 and 36. Preferably, the lines 24 are on at least one of the planar surfaces 34 or 36 of the third layer 32. In a preferred embodiment the third layer 32 includes an area 38 void of any lines 24 through which the message 12 may be viewed without obstruction from the lines 24. In a preferred embodiment, the void area 38 is substantially in registration with the message 12. Advantageously, this embodiment of the invention permits the message 12 and/or the third layer 32 with the lines 24 to be interchanged in any desired manner or purpose of the merchant.

In use, when a viewer, such as a pedestrian or other observer moves or changes his perspective of the display 10, the lines 24 have the illusion of moving. In the case where the display 10 includes a solid image or message in combination with the lines 24, the two-dimensional display gives the appearance of having a non-moving portion, (i.e., the image, message, etc.), and a moving portion, (i.e., the lines 24). Advantageously the printed message 12 has not been segmented or rastorized in a manner that produces a separation or spacing adapted for placing different or additional information on the display. By retaining the message 12 as a whole, the message will always be able to be seen regardless of the perspective of the observer. For example, in FIG. 1 the printed 12 includes the word "DANGER" bordered by vertical lines 24 and horizontal lines 26. As the viewer moves past the display 10, the word remains static so that the viewer may focus on the message as a whole while the lines 24 and 26 produce an illusion of movement to draw the viewer's attention to the display 10 and ultimately to the word "DANGER".

Although not preferred, the display 10 can further include an illumination means known to those skilled in the display art so the message and the visual effect of the lines 5 may be observed during hours when external illumination may not be sufficient. The display 10 may be illuminated using incandescent, fluorescent, direct or indirect lighting.

In another aspect of the invention, a method for preparing a two-dimensional display having a visual effect of movement is provided. The display can be composed of a single layer or a plurality of layers as seen in FIGS. 1–6. In the method of the invention, a basic message is printed on a substantially planar surface of one of the layers. Covering the printed information is a lenticular lens composed of a series or array of lenticule lenses. Each lenticule has a flat or planar surface which, if desired, collectively may provide the substantially flat surface on which the message, lines or both are printed. Alternatively, another substantially planar layer may be used for printing the message, lines or both thereon. Extending over at least a portion of the lens is a line and preferably a plurality of spaced apart lines positioned adjacent to the printed message. The lines are spaced a predetermined distance ($L_1$) so that they are in non-registration with the spacing ($W_1$) of the lenticules forming the lenticular lens. The lines may reside in a co-planar, non-planar or combination thereof relationship with the message.

Although the present invention has been described in terms of the presently preferred embodiment, it is to be understood that such disclosure is not to be interpreted as limiting to the invention described herein. No doubt that after reading the disclosure, various alterations and modifications will become apparent to those skilled in the art to which the invention pertains. It is intended that the appended claims be interpreted as covering all such alterations and modifications as fall within the spirit and scope of the invention.

What is claimed is:

1. A two-dimensional display having a three-dimensional visual presentation of information comprising a lenticular lens having a first planar surface and printed information on said first planar surface, said first planar surface having a plurality of spaced apart lines traversing a distance of at least a portion of said first planar surface and said lenticular lens includes a plurality of adjacent lenticules, each of said lenticules having a curvilinear second surface, said plurality of spaced apart lines have a non-registration spacing relative to said lenticules and wherein the number of said spaced apart lines per inch differs from about 0.5% to about 25% relative to the number of lenticules per inch in said lenticular lens so that said plurality of spaced apart lines produces a visual effect of movement as a viewer's line of sight changes relative to said display and said printed information remains stationary.

2. The display of claim 1 wherein said lenticules have a focal ppoint of from 0 to about 0.5 inches beyond said first planar surface.

3. The display of claim 2 wherein from 0% to 100% of said plurality of spaced apart lines have a horizontal component and a vertical component.

4. The display of claim 2 wherein said plurality of spaced apart lines forms a grid configuration.

5. The display of claim 1 wherein said plurality of spaced apart lines are parallel and uniformly spaced.

6. The display of claim 1 wherein said lenticular lens has from 3 lenticules per inch to about 250 lenticules per inch.

7. The display of claim 6 wherein the number of said spaced apart lines per inch differs from about 2% to about 20% relative to the number of lenticules per inch in said lenticular lens.

8. The display of claim 6 wherein the number of spaced apart lines per inch differs from about 2.5% to about 15% relative to the number of lenticules per inch in said lenticular lens.

9. The display of claim 1 wherein said lenticular lens is a thermoplastic.

10. The display of claim 9 wherein said thermoplastic is selected from the group consisting of polyesters and copolyesters of terephthalic acid and aliphatic glycols, polycarbonates, polystyrene, acrylics, polyacrylates, polyolefins, vinyl chloride polymers, styrene, polyurethanes, and mixtures thereof.

11. The display of claim 10 wherein said copolyesters of terephthalic acid and aliphatic glycols comprise an acid component of at least 75 mole % terephthalic acid and a glycol component comprising from about 3 to about 65 mole % selected from the group consisting of 1,4-cyclohexanedimethanol and neopentyl glycol and from about 97 to about 35 mole % ethylene glycol.

12. The display of claim 11 wherein said glycol component includes up to about 35 mole % of a glycol selected from the group consisting of diethylene glycol; propylene glycol; neopentyl glycol; 2,2,4,4-tetramethyl-1,3-cyclobutanediol; 1,3-propanediol; 1,4-butanediol; 1,6-hexanediol; cis/trans mixtures of 1,4-cyclohexanedimethanol and mixtures thereof.

13. The display of claim 11 wherein said glycol component includes up to about 30 mole % of a glycol selected from the group consisting of diethylene glycol; propylene glycol; neopentyl glycol; 2,2,4,4-tetramethyl-1,3-cyclobutanediol; 1,3-propanediol; 1,4-butanediol; 1,6-hexanediol; cis/trans mixtures of 1,4-cyclohexanedimethanol and mixtures thereof.

14. The display of claim 11 wherein said glycol component includes up to about 20 mole % of a glycol selected from the group consisting of diethylene glycol; propylene glycol; neopentyl glycol; 2,2,4,4-tetramethyl-1,3-cyclobutanediol; 1,3-propanediol; 1,4-butanediol; 1,6-hexanediol; cis/trans mixtures of 1,4-cyclohexanedimethanol and mixtures thereof.

15. The display of claim 11 wherein said glycol component comprises from about 25 mole % to about 35 mole % selected from the group consisting of neopentyl glycol and 1,4-cyclohexanedimethanol and from about 75 mole percent to about 65 mole percent ethylene glycol.

16. The display of claim 9 wherein said thermoplastic is selected from the group consisting of polyethylene terephthalate (PET); polybutylene terephthalate (PBT); poly (methyl methacrylate), methyl methacrylate and copolymers thereof with other vinyl monomers such as other alkyl methacrylates or alkyl acrylates; polyethylene; polyvinyl chloride and its copolymers with other vinyl monomers such as vinylidene chloride; polyurethanes having residues from 2,4-toluenediisocyanate, 1,4-diisocyanatobenzene and the like with diols such as 4,4'-bis(omega-hydroxyalkoxy) biphenyls, poly(propylene glycol), poly(tetramethylene) glycol, poly(1,4-butylene adipate), poly(ethylene-co-1,4-butylene adipate), polycaprolactone, poly(1,6-hexamethylene) carbonate and mixtures thereof.

17. A method for making a two-dimensional display sign having a visual effect of movement as a viewer's line of sight changes relative to the display, said method comprising:

providing a lenticular lens having a plurality of adjacent lenticules which define a first planar surface and a non-planar second surface, and each lenticule has a predetermined spacing or width; and providing printed matter on said first planar surface wherein said printed matter includes non-segmented printed information and a plurality of spaced apart lines, said lines traversing a distance of at least a portion of said first planar surface, wherein the number of said lines per inch differs from about 0.5% to about 25% from the number of lenticules per inch and wherein said lines have a non-registration spacing relative to said spacing of said lenticules.

18. The method of claim 17 wherein said lines are parallel and uniformly spaced.

19. The method of claim 17 wherein from 0% to 100% of said lines have a horizontal component and a vertical component.

20. The method of claim 17 wherein said lines form a grid configuration.

21. The method of claim 17 wherein said lenticular lens has from 3 lenticules per inch to about 250 lenticules per inch.

22. The method of claim 17 wherein the number of said lines per inch differs from about 2% to about 20% from the number of lenticules per inch.

23. The method of claim 17 wherein the number of lines per inch differs from about 2.5% to about 15% from the number of lenticules per inch.

24. The method of claim 17 wherein said lenticular lens is a thermoplastic.

25. The method of claim 24 wherein said thermoplastic is selected from the group consisting of polyesters and copolyesters of terephthalic acid and aliphatic glycols, polystyrene, polyolefins, polycarbonates, acrylics, polyacrylates, vinyl chloride polymers, styrene, polyurethanes and mixtures thereof.

26. The method of claim 25 wherein said thermoplastic is selected from the group consisting of polyethylene terephthalate (PET); polybutylene terephthalate (PBT); poly (methyl methacrylate), methyl methacrylate and copolymers thereof with other vinyl monomers such as other alkyl methacrylates or alkyl acrylates; polyethylene; polyvinyl chloride and its copolymers with other vinyl monomers such as vinylidene chloride; polyurethanes having residues from 2,4-toluenediisocyanate, 1,4-diisocyanatobenzene and the like with diols such as 4,4'-bis(omega-hydroxyalkoxy) biphenyls, poly(propylene glycol), poly(tetramethylene) glycol, poly(1,4-butylene adipate), poly(ethylene-co-1,4-butylene adipate), polycaprolactone, poly(1,6-hexamethylene) carbonate and mixtures thereof.

* * * * *